(12) United States Patent
Garbow

(10) Patent No.: US 7,979,743 B2
(45) Date of Patent: Jul. 12, 2011

(54) DETERMINING CORRECTNESS OF JOB PLANS IN A STREAM PROCESSING APPLICATION

(75) Inventor: Zachary A. Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 12/180,615

(22) Filed: Jul. 28, 2008

(65) Prior Publication Data
US 2010/0023799 A1    Jan. 28, 2010

(51) Int. Cl.
*G06F 11/00* (2006.01)
(52) U.S. Cl. .......................................... 714/25
(58) Field of Classification Search .................... 714/25, 714/2; 712/20, 22
See application file for complete search history.

(56) References Cited

U.S. PATENT DOCUMENTS

| | | | | |
|---|---|---|---|---|
| 4,964,126 A | * | 10/1990 | Musicus et al. | 714/797 |
| 6,550,018 B1 | * | 4/2003 | Abonamah et al. | 714/6 |
| 2003/0188221 A1 | * | 10/2003 | Rasmussen et al. | 714/11 |
| 2005/0223274 A1 | * | 10/2005 | Bernick et al. | 714/11 |
| 2006/0101303 A1 | * | 5/2006 | Bower et al. | 714/5 |
| 2006/0107112 A1 | * | 5/2006 | Michaelis et al. | 714/15 |
| 2006/0156066 A1 | * | 7/2006 | Pisarski | 714/38 |

\* cited by examiner

*Primary Examiner* — Scott T Baderman
*Assistant Examiner* — Yair Leibovich
(74) *Attorney, Agent, or Firm* — Patterson & Sheridan, LLP

(57) ABSTRACT

Embodiments of the invention provide techniques for determining the correctness of similar job plan segments in a stream processing application. In one embodiment, a job manager may be configured to identify similar job plan segments based on data formats, functionality, and surrounding processing elements. The job manager plan may be further configured to determine whether the similar segments provide inconsistent results, and if so, to determine which of the inconsistent similar segments is invalid. The job manager may identify an invalid processing element included in the invalid segment. The job manager may also perform corrective actions to address the invalid processing element.

22 Claims, 4 Drawing Sheets

DETERMINING CORRECTNESS OF JOB PLANS IN A STREAM PROCESSING APPLICATION

BACKGROUND OF THE INVENTION

1. Field of the Invention

Embodiments of the invention generally relate to computer processing. More specifically, embodiments of the invention are directed to determining the correctness of similar job plans of a stream processing application.

2. Description of the Related Art

Distributed computing systems, such as grid computing and computer clusters, are useful tools for breaking down large computing tasks, or jobs, into many smaller tasks that execute concurrently. Used in this manner, distributed systems are highly effective tools to perform large computing tasks in a minimal amount of time.

Distributed systems typically contain a large number of heterogeneous computing systems each providing one or more compute nodes or processors able to perform computing tasks independently from one another. High-speed data communication networks are used to coordinate computing activity, such as inter-node messaging. Because the heterogeneous systems have different hardware architectures, each provides different advantages in executing different types of software. For example, systems with large memories provide good architectures for running database applications.

In some situations, systems with a number of specialized processors are used for stream processing applications, meaning processing of a flow of information. For example, the System S stream processing framework available from IBM is designed to run in a heterogeneous hardware environment, taking advantage of x86, Cell, Blue Gene, or even Power-based servers. In particular, systems based on the Cell processor available from IBM appear to be a well-suited for these types of applications because of that processor's natural abilities as a stream computing platform. Suitable platforms can range from a single CPU up to 10,000 servers.

As the amount of data available to enterprises and other organizations dramatically increases, more and more companies are looking to turn this data into actionable information and knowledge. Addressing these requirements requires systems and applications that enable efficient extraction of knowledge and information from potentially enormous volumes and varieties of continuous data streams. Stream processing provides an execution platform for user-developed applications that ingest, filter, analyze, and correlate potentially massive volumes of continuous data streams. It supports the composition of new applications in the form of stream processing graphs that can be created on the fly, mapped to a variety of hardware configurations, and adapted as requests come and go and relative priorities shift.

SUMMARY OF THE INVENTION

One embodiment of the invention includes a computer-implemented method for determining correctness of a job plan in a stream processing application executed by a stream application framework. The method generally includes: receiving a job plan for a stream processing application, the job plan comprising at least a first directed sequence of processing elements, wherein each processing element in the directed sequence is configured to generate an output data for an input data; identifying based on predetermined criteria, a second directed sequence of processing elements, similar to the first directed sequence; processing a set of input data in both the first directed sequence and the second directed sequence. The method may also include, upon determining that the output of processing the set of input data in the second directed sequence is inconsistent with the output of processing the set of input data in the first directed sequence: identifying, from the first directed sequence and the second directed sequence, an invalid directed sequence, wherein processing the invalid directed sequence does not result in correct results; and performing at least one corrective action to address the invalid directed sequence.

Another embodiment of the invention includes a computer-readable storage medium containing a program, which when executed on a processor, performs an operation for determining correctness of a job plan in a stream processing application executed by a stream application framework. The operation may generally include: receiving a job plan for a stream processing application, the job plan comprising at least a first directed sequence of processing elements, wherein each processing element in the directed sequence is configured to generate an output data for an input data; identifying based on predetermined criteria, a second directed sequence of processing elements, similar to the first directed sequence; processing a set of input data in both the first directed sequence and the second directed sequence. The operation may also include, upon determining that the output of processing the set of input data in the second directed sequence is inconsistent with the output of processing the set of input data in the first directed sequence: identifying, from the first directed sequence and the second directed sequence, an invalid directed sequence, wherein processing the invalid directed sequence does not result in correct results; and performing at least one corrective action to address the invalid directed sequence.

Still another embodiment of the invention includes a system having a processor and a memory containing a program, which when executed by the processor is configured to perform an operation. The operation may generally include: receiving a job plan for a stream processing application, the job plan comprising at least a first directed sequence of processing elements, wherein each processing element in the directed sequence is configured to generate an output data for an input data; identifying based on predetermined criteria, a second directed sequence of processing elements, similar to the first directed sequence; processing a set of input data in both the first directed sequence and the second directed sequence. The operation may also include, upon determining that the output of processing the set of input data in the second directed sequence is inconsistent with the output of processing the set of input data in the first directed sequence: identifying, from the first directed sequence and the second directed sequence, an invalid directed sequence, wherein processing the invalid directed sequence does not result in correct results; and performing at least one corrective action to address the invalid directed sequence.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
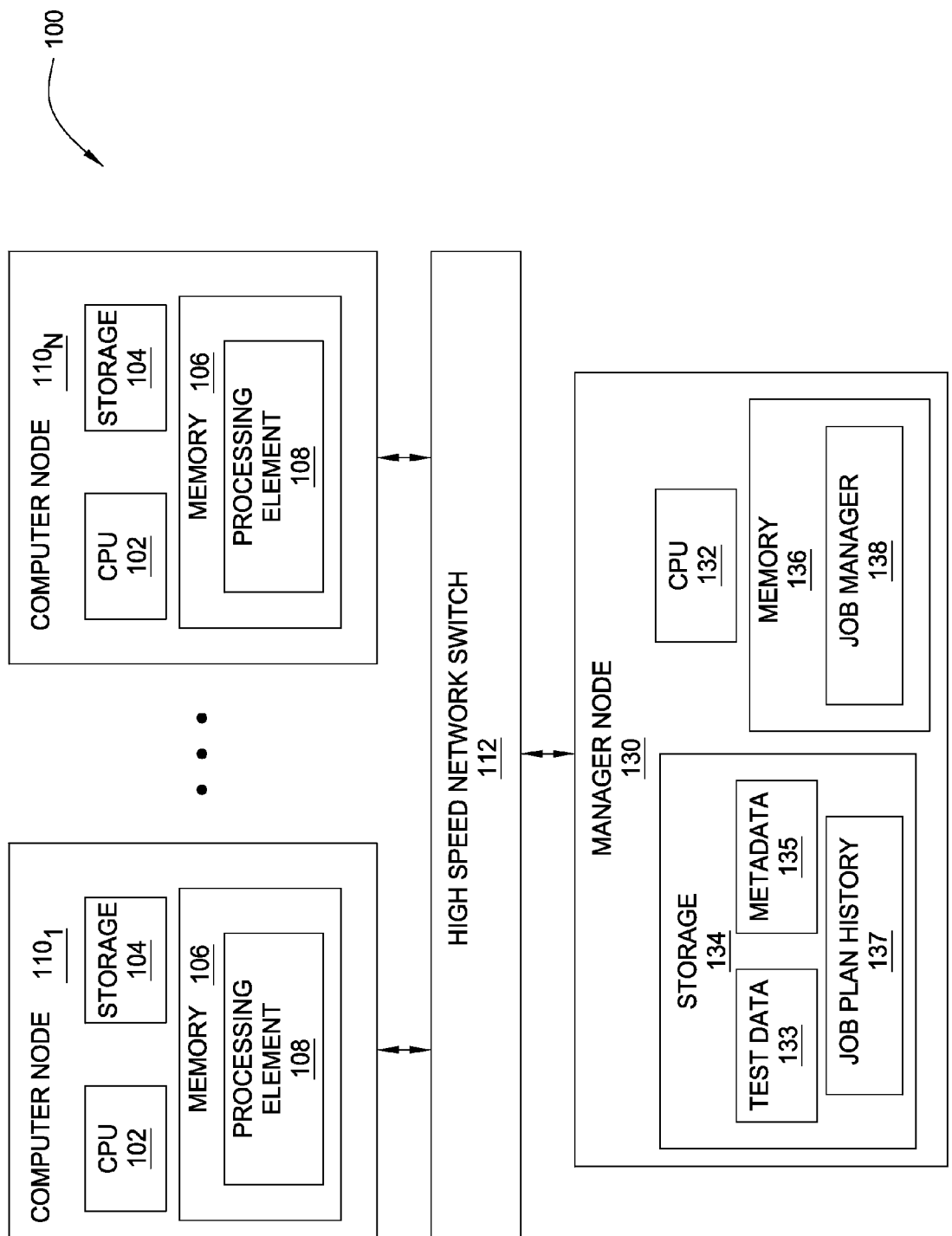
FIG. 1 is a block diagram that illustrates a computing system configured for stream processing, according to one embodiment of the invention.

In stream processing applications, data is received by a processing system in the form of a flow of information. Examples of stream processing applications include audio processing, video processing, transaction processing, sensor processing, and the like. One type of stream processing system is composed of multiple nodes, with each node representing a separate processing element (also known as "analytics"). In such a system, each processing element may perform a separate processing task upon a data stream, as specified by a given job plan. Each job plan may provide a directed graph connecting processing elements made available by (or composed for) the stream processing framework. That is, each job plan defines a directed data flow through the stream application framework. For example, various processing elements may be used to analyze, filter, and annotate a data stream. The task performed by each processing element may be specified in a job plan. The job plan may be generated by a job manager application.

A sequence of processing elements included in a job plan may be described as a job plan segment. Generally, a given job plan segment may perform the same processing function as other job plan segments that include different processing elements. Thus, a job plan may be composed using any one of the multiple similar job plan segments that perform an equivalent processing function. However, in some cases, similar job plan segments may produce different results when processing the same input data. In such cases, one of the job plan segments producing different results may be assumed to be invalid, meaning it is not functioning properly. The invalid job plan segment may be due to, for example, inclusion of an invalid processing element, incompatibility between the processing elements included in the segment, and the like.

Embodiments of the invention provide techniques for determining the correctness of similar job plan segments in a stream processing application. In one embodiment, a job manager may be configured to identify similar job plan segments based on data formats, functionality, and surrounding processing elements. The job manager plan may be further configured to determine whether the similar segments provide inconsistent results, and if so, to determine which of the inconsistent similar segments is invalid. The job manager may identify an invalid processing element included in the invalid segment. The job manager may also perform corrective actions to address the invalid processing element.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a computing system 100 configured for stream processing, according to one embodiment of the invention. Of course, the computing system 100 is shown for illustrative purposes, and is not intended to limit the present invention. Embodiments of the invention may be adapted use with a variety of distributed computer systems, including grid computing, computing clusters, adaptive architecture supercomputing, and the like. Further, embodiments of the invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, computing system 100 includes computing nodes $110_1$-$110_N$ and a manager node 130, connected via a high-speed network switch 112. Of course, those skilled in the art will recognize that FIG. 1 provides a simplified representation of a stream processing system, and that the computing system 100 may include a number of different and/or additional elements.

As shown, each computing node 110 may include a CPU 102, storage 104 and memory 106, typically connected by a bus (not shown). CPU 102 is a programmable logic device that performs all the instruction, logic, and mathematical processing in a computer. Storage 104 includes hard-disk drives, flash memory devices, optical media and the like. Memory 106 includes a processing element 108. In one embodiment, each processing element 108 may represent a software application configured to perform a separate processing task upon a data stream. That is, the processing elements 108 included in the various computing nodes $110_1$-$110_N$ may perform various processing tasks on a data stream, such as analysis, filtering, annotating, and the like. Further, each computing node 110 may include multiple processing elements 108.

As shown, the manager node 130 may include a CPU 132, storage 134 and memory 136, typically connected by a bus (not shown). CPU 132 is a programmable logic device that performs all the instruction, logic, and mathematical processing in a computer. The storage 134 includes hard-disk drives, flash memory devices, optical media and the like. The storage 134 includes test data 133, metadata 135 and job plan history 137, which are described further below. The memory 136 includes a job manager 138, representing a software application configured to generate job plans. Each job plan may specify a sequence of tasks performed by the processing elements 108 to process stream data received by the computing system 100.

In one embodiment, the job manager 138 may be configured to identify similar job plan segments included in job plans. More specifically, the job manager 138 may compare a segment included in a given job plan to segments included in existing job plans, so as to identify segments that perform similar processing functions. The existing job plans may be current job plans being executed in the computing system 100. Optionally, the existing job plans may be previously executed job plans, and which may be stored, e.g., in job plan history 137 included in storage 134.

The job manager 138 may be configured to identify similar segments based on multiple criteria. The criteria may include determining whether the segments have the same input and output data formats. The criteria may also include determining whether the segments include processing elements that perform the same processing functions. In one embodiment, the processing functions may be determined from descriptions of each processing element stored in the metadata 135. Furthermore, the criteria may include determining whether the segments are preceded and succeeded by the same processing elements within their respective job plans. An example of such criteria is discussed below with reference to FIGS. 2A-2B.

Figure 2:
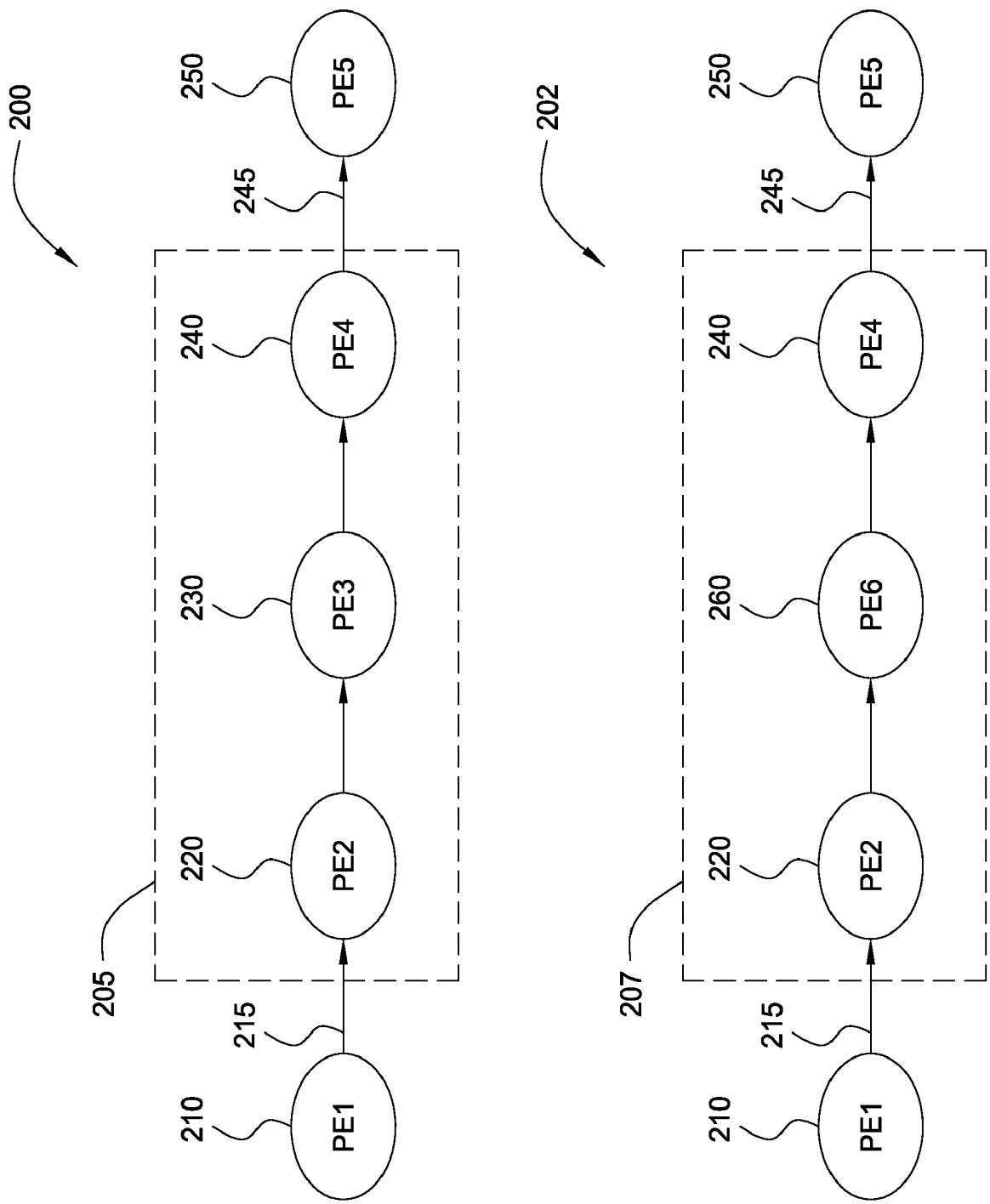
FIGS. 2A-2B illustrate an example of job plans that share a similar segment, according to one embodiment of the invention.

FIGS. 2A-2B illustrate an example of job plans that share a similar segment, according to one embodiment of the invention. As shown, FIG. 2A illustrates a job plan 200, which includes five nodes 210-250. The nodes 210-250 may represent examples of the computing nodes $110_1$-$110_N$ shown in FIG. 1. In one embodiment, job plan 200 may be generated by the job manager 138 shown in FIG. 1. As shown, job plan 200 includes a segment 205 (shown within a dotted line), which includes three nodes 220, 230 and 240. More specifically, segment 205 may describe a flow of stream data (represented by arrows) through three processing elements which together perform a particular processing function (or functions) required by a stream processing application (e.g., analyzing, filtering, annotating, etc.). As shown, the "PE1" node 210 passes the data input 215 (represented by an arrow) to segment 205, and the segment 205 passes the data output 245 to the "PE5" node 250. Assume that the data input 215 and the data output 245 are each configured according to a particular data format.

FIG. 2B illustrates a second job plan 202. As shown, the job plan 202 includes a segment 207, which is made up of nodes 220, 260 and 240. Note that segment 205 and segment 207 include the same nodes, except that the third node of segment 205 is the "PE3" node 230, and the second node of segment 207 is the "PE6" node 260. Assume that "PE6" node 260 provides the same functionality as "PE3" node 220. Thus, segment 207 provides the same stream processing functionality as segment 205. Note also that the "PE1" node 210 provides data input 215 to segment 207, and that segment 207 provides data output 245 to the "PE5" node 250. Thus, segment 207 has the same predecessor and successor nodes as segment 205. Further, the data format of the input received by both segment 207 and segment 205 is the same. Furthermore, the data format of the output produced by both segment 207 and segment 205 is the same. Accordingly, in one embodiment, job manager 138 may determine that segment 205 and segment 207 are similar, since they provide the similar stream processing functionality, have the same predecessor and successor nodes, and have the same data formats in inputs and outputs. Of course, the job plans 200, 202 are greatly simplified representations of job plans. Generally, actual job plans may include many more nodes than shown in FIGS. 2A-2B.

In some cases, similar segments may produce inconsistent results, meaning they do not produce the same results when processing the same input data. Such segments are referred to herein as "inconsistent segments." The input data processed by similar segments may be, e.g., a stream of actual data received by the stream processing application, or predefined input data processed in the segments for testing purposes. Further, in the event that two segments have inconsistent results, it may be determined that one of the segments is not providing the processing functionality required by the stream processing application. Such a segment is referred to simply as an "invalid segment." In some cases, a segment may be invalid because it includes one or more processing elements that are not functioning properly. For example, processing elements may include incorrect program code. Such processing elements may be referred to simply as "invalid processing elements." In such cases, if the invalid segment includes a particular processing element that is not included in a valid similar segment, it may be determined that the particular processing element is invalid, and is thus causing the segment to be invalid. For example, assuming that the segment 205 is invalid and segment 207 is valid, it may be determined that the "PE3" node 230 is invalid, and is the cause of segment 205 being invalid. However, in other cases, a segment may be invalid because multiple processing elements included in the segment are not compatible to each other. That is, each processing element of the segment may be individually valid, but may not function properly in combination. For example, the nodes included in the segment 205 may have incompatible interfaces with preceding or succeeding processing elements, or may have incorrect handling of boundary conditions, and may thus cause the segment 205 to be invalid.

In one embodiment, the job manager 138 may be configured to identify job plans segments that are similar, but nevertheless produce inconsistent results. More specifically, the job manager 138 may compare outputs of similar segments when processing the same input data and, upon determining that the outputs are different, may identify those segments as inconsistent which each other. Optionally, the job manager 138 may identify inconsistent segments only if the difference between the segment outputs exceeds a predefined threshold. For example, the job manager 138 may be configured to ignore output values of similar segments that differ by less than one percent. Further, the job manager 138 may be configured to compare the outputs of two similar segments in a single point in time, or in multiple instances spread over a period of time. In the case of comparing the outputs of multiple instances spread over a period of time, the outputs of previous instances may be persistently stored in the job plan history 137. Optionally, the job manager 138 may notify a user that inconsistent segments have been identified in the stream processing application. The user may then take further actions to resolve the inconsistent segments.

In one embodiment, the job manager 138 may be configured to identify an invalid segment by use of a third similar segment. More specifically, upon detecting two inconsistent segments, the job manager 138 may be configured to process the same input data through the third similar segment. In the event that the output of the third segment matches the output of one of the inconsistent segments, the remaining segment may be assumed to be invalid. That is, since two different segments agree in results, they are in the majority, and there may thus be a stronger confidence that their result is correct. Thus, the job manager 138 may identify the remaining segment as invalid.

In one embodiment, the job manager 138 may be configured to identify an invalid segment by use of test data. That is, the job manager 138 may process predefined input data in order to determine which of the similar segments is invalid. For example, the test data 133 (included in storage 134) may include specific input data which, after being processed correctly, is known to produce a specific output. In one embodiment, the known output may also be included in test data 133. Thus, the job manager 138 may be configured to process input data stored in test data 133 in both of the similar segments, and to compare the results of each segment to the known output specified in test data 133. Upon determining that a segment does not produce the correct results, the job manager 138 may identify that segment as invalid.

In one embodiment, the job manager 138 may be configured to identify an invalid segment by use of trust ratings. More specifically, upon detecting two inconsistent segments, the job manager 138 may determine which segment is invalid by comparing trust ratings for each segment. The trust ratings may be, e.g., quantitative measures of trust based on the number of times that each segment was previously determined to be valid or invalid. Further, such trust ratings may be stored in metadata 135. In one embodiment, the job manager 138 may be further configured to perform corrective actions for invalid job plan segments. Such corrective actions are discussed below with reference to FIG. 4.

Figure 3:
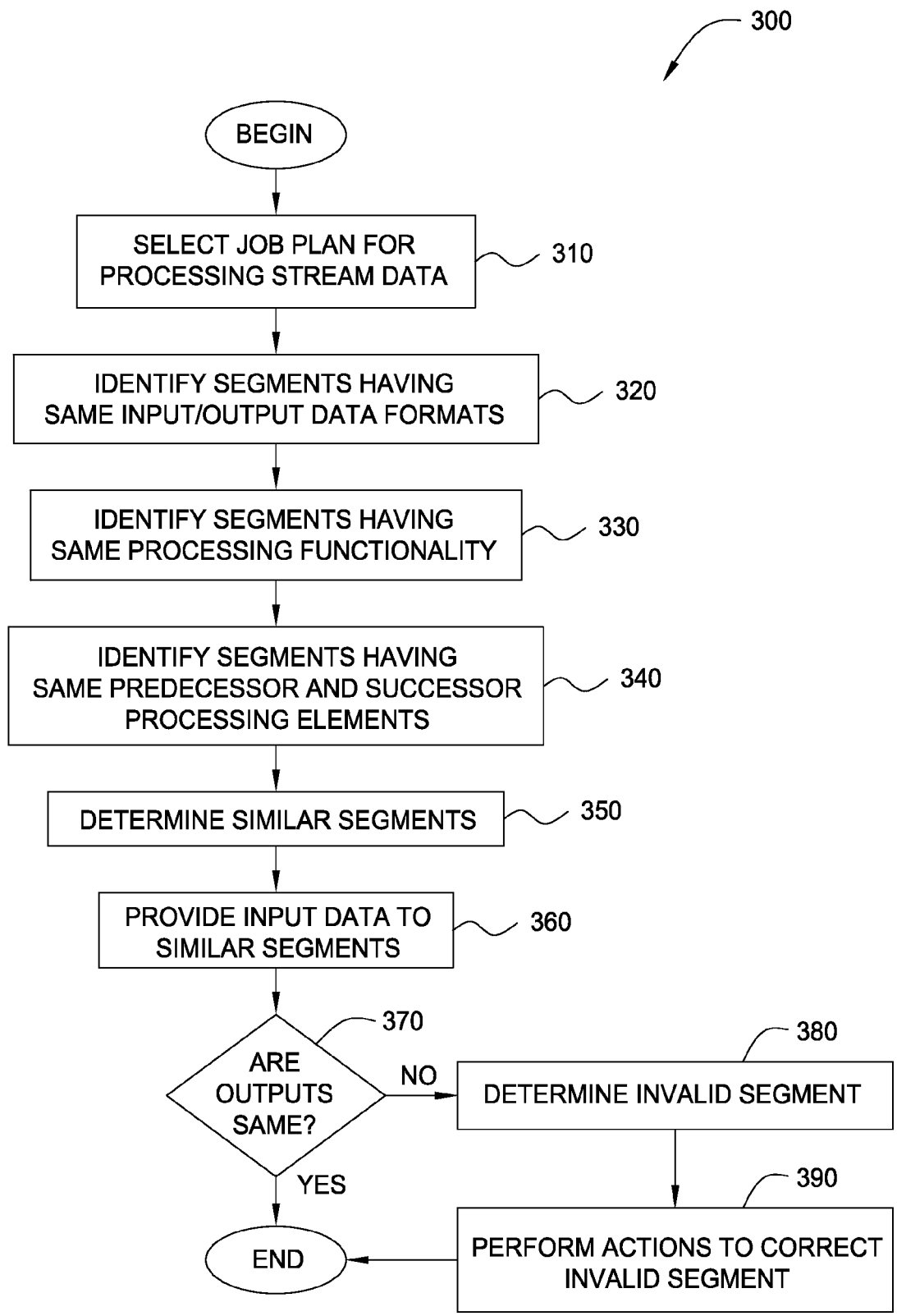
FIG. 3 is a flow diagram illustrating a method for identifying inconsistent job plan segments of a stream processing application, according to one embodiment of the invention.

FIG. 3 is a flow diagram illustrating a method 300 for identifying inconsistent job plan segments of a stream processing application, according to one embodiment of the invention. Persons skilled in the art will understand that, even though the method is described in conjunction with the system of FIG. 1, any system configured to perform the steps of method 300, in any order, is within the scope of the present invention.

The method 300 begins at step 310, where a job plan is selected to process an incoming data stream through a stream application framework, according to the selected job plan. For example, the job manager 138 may generate a job plan to process stream data (e.g., audio data, video data, transaction data, sensor data, etc.) in the computing system 100 (shown in FIG. 1). Optionally, the job plan may be a previous job plan retrieved from the job plan history 137, may be received from an external system, or may be selected from some other source. Generally, the selected job plan may include one or more segments, meaning a directed sequence of processing elements (e.g., the segment 205 shown in FIG. 2A).

At step 320, the job manager 138 may identify segments in the selected job plan that are similar to segments in another job plan. For example, segments having the same input and output data formats as the segments of the selected job plan. That is, the job manager 138 may match a segment of the selected job plan (e.g., segment 205 shown in FIG. 2A) to another segment (e.g., segment 207 shown in FIG. 2B) based on inputs and outputs that have the same data formats (e.g., data input 215 and data output 245 shown in FIG. 2A). The matched segment may be included in the selected job plan, may be included in another job plan being executed in the stream processing application, or may be included in a previous job plan stored in the job plan history 137. Either segment may include multiple processing elements, or may include a single processing element.

At step 330, the job manager 138 may identify segments having the same processing functionality. For example, the job manager 138 may match segments performing the same sequence of tasks for processing streamed transaction data (e.g., analyzing, filtering, annotating, etc.). At step 340, the job manager 138 may identify segments having the same predecessor and successor processing elements. For example, the job manager 138 may match segment 205 to segment 207, since they are both preceded by the "PE1" node 210, and are both followed by the "PE5" node 250 (as shown in FIGS. 2A-2B).

At step 350, the job manager 138 may determine, based on the results of steps 320, 330 and 340, whether two segments are similar. That is, the job manager 138 determines similar segments based on input/output data formats, processing functionality and surrounding processing elements. At step 360, the job manager 138 may provide input data to the similar segments in order to determine if they are inconsistent (i.e., they produce different results after processing the same input data). The input data may be, e.g., live data received by the stream processing application, or may be predefined test input data.

At step 370, the job manager 138 may determine whether the outputs of the similar segments processing the same input data are the same. If so, the method 300 terminates. However, if it is determined that the outputs of the similar segments are not the same, then at step 380, the job manager 138 may determine which segment is invalid, meaning it is not functioning as required by the stream processing application. In one embodiment, the job manager 138 may compare the results of processing predefined test input data to known outputs, thus determining which segment is invalid. In another embodiment, the job manager 138 may determine an invalid segment by comparing the outputs of three or more segment processing the same input data. In the event that all but one segment provides the same result, the segment providing a different result may be determined to be invalid. In yet another embodiment, the job manager 138 may determine an invalid segment based on trust ratings, meaning scores reflecting a number of previous instances that the segment was found to be valid or invalid. In yet another embodiment, the job manager 138 may prompt a user to manually identify an invalid segment. For example, the user may be presented with a debugging tool in order to debug the similar segments, or may be allowed to select the invalid segment based on personal judgment, experience, etc.

At step 390, corrective actions may be performed to address the invalid segment. Such actions may be performed automatically by, e.g., the job manager 138, may be performed manually by a user, or may be performed in another manner. Corrective actions which may be performed at step 390 are discussed in greater detail below with reference to FIG. 4. After step 390, the method 300 terminates.

Figure 4:
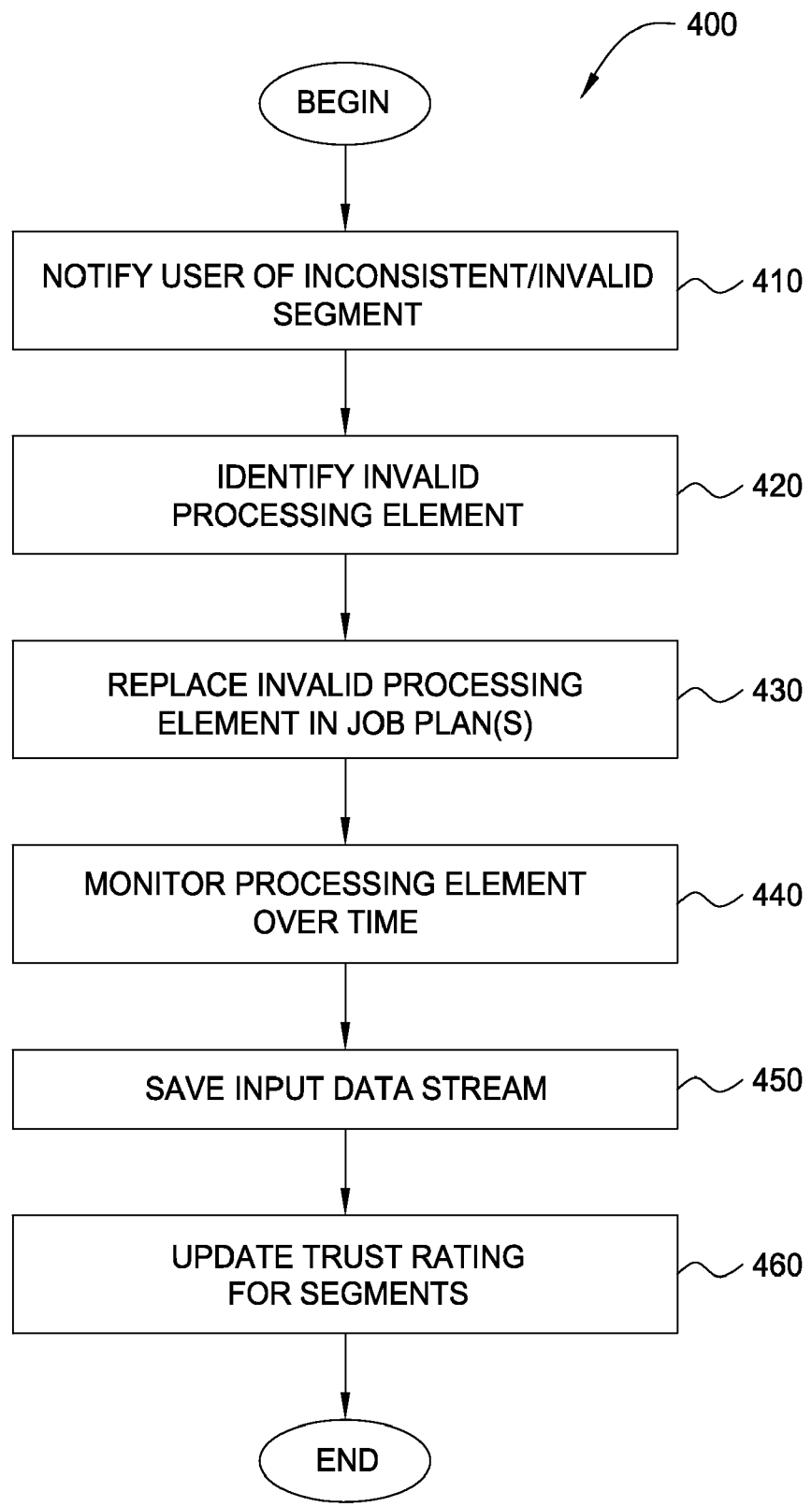
FIG. 4 is a flow diagram illustrating a method for performing corrective actions for inconsistent segments included in a stream processing application, according to one embodiment of the invention.

FIG. 4 is a flow diagram illustrating a method 400 for performing corrective actions for inconsistent segments included in a stream processing application, according to one embodiment of the invention. Persons skilled in the art will understand that, even though the method is described in conjunction with the system of FIG. 1, any system configured to perform the steps of method 400, in any order, is within the scope of the present invention. The method 400 represents one embodiment of the step 390 of the method 300 illustrated in FIG. 3. Thus, assume that the steps of method 400 may be optionally performed in response to identifying inconsistent and/or invalid segments in a job plan.

The method 400 begins at step 410, where a job manager 138 (shown in FIG. 1) notifies a user of a stream processing application of inconsistent and/or invalid segments. That is, after identifying inconsistent and/or invalid segments in a job plan, the job manager 138 may trigger a notification to the user of the stream processing application. Such notifications may include, e.g., an email, a text message, a system alert, etc. The user may then perform further corrective actions, such as manually debugging the segments to identify an invalid processing element.

At step 420, in response to determining an invalid segment (as described above with reference to step 380 of method 300), the job manager 138 may be configured to identify an invalid processing element included in the invalid segment. For example, referring to FIGS. 2A-2B, assume that the segment 205 is invalid and that the segment 207 is valid. Thus, the job manager 138 may determine that the "PE3" node 230 is invalid, since it represents the only difference between the two segments. In some cases, the job manager 138 may determine that multiple processing elements included in the invalid segment are not compatible to each other. For example, the nodes 220, 230 and 240 included in the segment 205 may not be compatible, and may thus cause the segment 205 to be invalid.

At step 430, the job manager 138 may be configured to replace the identified invalid processing element (or multiple incompatible processing elements) in other segments. The replacement may be performed in other segments of the current job plan, as well as segments of other job plans (e.g., job plans currently being executed, job plans stored in the job plan history 137, etc.). Optionally, a portion of a current job plan that includes a replaced processing element may be re-run using saved input data. Further, the job manager 138 may be configured to consider additional objectives when replacing invalid processing elements. For example, the job manager 138 may only replace a processing element if doing so would not cause the job plan to exceed allowable thresholds for cost, processing time, network latency, licensing limitations, etc.

At step 440, the job manager 138 may monitor the identified invalid processing element over time. That is, if the invalid processing element is not replaced in all job plans (as described with reference to step 430), the job manager 138 may monitor further instances of use of the processing element. This monitoring may be performed, e.g., in order to collect more data indicating whether the processing element is invalid. At step 450, the job manager 138 may save the input data processed by the invalid segment. Such input data may be stream data (e.g., audio data, video data, transaction data, sensor data, and the like). For example, the input data may be saved in case the invalid segment fails, and a user wishes to re-create the situation which caused the failure. Further, the input data may be saved to be reprocessed once the invalid segment can be replaced or corrected.

At step 460, the job manager 138 may update trust ratings describing the segments of a job plan. For example, trust ratings may be quantitative measures of trust stored in metadata 135. In one embodiment, the job manager 138 may increase a trust rating for a segment determined to be valid, and may decrease a trust rating for a segment determined to be invalid. Such trust ratings may be used in future instances of identifying invalid segment (as described with reference to step 380 of method 300). After step 460, the method 400 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method for determining correctness of a job plan in a stream processing application executed by a stream application framework, the stream application framework including a plurality of processing elements executing across a plurality of compute nodes, comprising:

receiving a job plan for a stream processing application, the job plan comprising at least a first directed sequence of processing elements from the plurality of processing elements, wherein each processing element in the first directed sequence of processing elements is configured to generate an output data for a respective input data;

identifying, based on predetermined criteria, a second directed sequence of processing elements, similar to the first directed sequence of processing elements;

processing a set of input data in both the first directed sequence of processing elements and the second directed sequence of processing elements; and upon determining that a first output of processing the set of input data in the first directed sequence of processing elements is inconsistent with a second output of processing the set of input data in the second directed sequence of processing elements:

identifying an invalid directed sequence of processing elements, wherein the invalid directed sequence of processing elements is a subset of at least one of the first directed sequence of processing elements and the second directed sequence of processing elements, and wherein processing the invalid directed sequence of processing elements results in incorrect results; and performing at least one corrective action to correct the invalid directed sequence of processing elements.

2. The method of claim 1, wherein the second directed sequence of processing elements is identified based on having a same input data format and a same output data format as the first directed sequence of processing elements.

3. The method of claim 1, wherein the second directed sequence of processing elements is identified based on having a same predecessor node and a same successor node as the first directed sequence of processing elements.

4. The method of claim 1, wherein the second directed sequence of processing elements is identified based on having a same stream processing functionality as first directed sequence of processing elements.

5. The method of claim 4, wherein the stream processing functionalities of the first directed sequence of processing elements and second directed sequence of processing elements are described by stored metadata.

6. The method of claim 1, wherein the set of input data comprises predefined test data processed by both the first directed sequence of processing elements and the second directed sequence of processing elements.

7. The method of claim 6, wherein identifying an invalid directed sequence of processing elements comprises comparing the output of the first directed sequence of processing elements and the output of the second directed sequence of processing elements to a predefined correct result from processing the predefined test data.

8. The method of claim 1, wherein identifying an invalid directed sequence of processing elements comprises comparing the output of the first directed sequence of processing elements and the output of the second directed sequence of processing elements to an output of processing the set of input data in a third directed sequence of processing elements, wherein the invalid directed sequence of processing elements is the directed sequence of processing elements having a different output from the other directed sequences.

9. The method of claim 1, wherein identifying an invalid directed sequence of processing elements comprises evaluating trust ratings of the first directed sequence of processing elements and the second directed sequence of processing elements, wherein the trust ratings describe past instances of each directed sequence of processing elements being either valid or invalid.

10. The method of claim 1, wherein performing at least one corrective action comprises determining an invalid processing element included in the invalid directed sequence of processing elements.

11. The method of claim 10, wherein performing at least one corrective action further comprises replacing the invalid processing element in at least one other job plan.

12. The method of claim 11, wherein replacing the invalid processing element in at least one other job plan is performed only if doing so does not cause the at least one other job plan to exceed allowable thresholds for additional criteria.

13. The method of claim 1, wherein performing at least one corrective action comprises notifying a user of the invalid directed sequence of processing elements.

14. The method of claim 1, wherein performing at least one corrective action comprises prompting a user to debug the invalid directed sequence of processing elements.

15. The method of claim 1, wherein performing at least one corrective action comprises monitoring the invalid directed sequence of processing elements over a defined time period.

16. The method of claim 1, wherein performing at least one corrective action comprises saving the set of input data such that it can be re-processed after replacing the invalid directed sequence of processing elements.

17. The method of claim 1, wherein performing at least one corrective action comprises updating a trust rating describing the invalid directed sequence of processing elements.

18. A computer readable storage medium containing a program which, when executed, performs an operation for determining correctness of a job plan in a stream processing application executed by a stream application framework, the stream application framework including a plurality of processing elements executing across a plurality of compute nodes, the operation comprising:
receiving a job plan for a stream processing application, the job plan comprising at least a first directed sequence of processing elements from the plurality of processing elements, wherein each processing element in the first directed sequence of processing elements is configured to generate an output data for a respective input data;
identifying based on predetermined criteria, a second directed sequence of processing elements, similar to the first directed sequence of processing elements;
processing a set of input data in both the first directed sequence of processing elements and the second directed sequence of processing elements; and
upon determining that a first output of processing the set of input data in the first directed sequence of processing elements is inconsistent with a second output of processing the set of input data in the second directed sequence of processing elements:
identifying an invalid directed sequence of processing elements, wherein the invalid directed sequence of processing elements is a subset of at least one of the first directed sequence of processing elements and the second directed sequence of processing elements, and wherein processing the invalid directed sequence of processing elements results in incorrect results; and
performing at least one corrective action to correct the invalid directed sequence of processing elements.

19. The computer readable storage medium of claim 18, wherein the second directed sequence of processing elements is identified based on having a same input data format and a same output data format as the first directed sequence of processing elements.

20. The computer readable storage medium of claim 18, wherein the second directed sequence of processing elements is identified based on having a same predecessor node and a same successor node as the first directed sequence of processing elements.

21. The computer readable storage medium of claim 18, wherein the second directed sequence of processing elements is identified based on having a same stream processing functionality as first directed sequence of processing elements.

22. A system in a stream application framework, the stream application framework including a plurality of processing elements executing across a plurality of compute nodes, comprising:
a processor; and
a memory containing a program which, when executed, performs an operation, the operation comprising:
receiving a job plan for a stream processing application, the job plan comprising at least a first directed sequence of processing elements from the plurality of processing elements, wherein each processing element in the first directed sequence of processing elements is configured to generate an output data for a respective input data;

identifying based on predetermined criteria, a second directed sequence of processing elements, similar to the first directed sequence of processing elements;

processing a set of input data in both the first directed sequence of processing elements and the second directed sequence of processing elements; and upon determining that a first output of processing the set of input data in the first directed sequence of processing elements is inconsistent with a second output of processing the set of input data in the second directed sequence of processing elements:

identifying an invalid directed sequence of processing elements, wherein the invalid directed sequence of processing elements is a subset of at least one of the first directed sequence of processing elements and the second directed sequence of processing elements, and wherein processing the invalid directed sequence of processing elements results in incorrect results; and performing at least one corrective action to correct the invalid directed sequence of processing elements.

* * * * *